(12) United States Patent
Sakazaki et al.

(10) Patent No.: US 7,478,653 B2
(45) Date of Patent: Jan. 20, 2009

(54) RESIN COMPOSITE FUEL HOSE

(75) Inventors: Kazushige Sakazaki, Komaki (JP); Hiroyoshi Mori, Iwakura (JP); Shinji Iio, Komaki (JP)

(73) Assignee: Tokai Rubber Industries, Ltd. (JP)

( * ) Notice: Subject to any disclaimer, the term of this patent is extended or adjusted under 35 U.S.C. 154(b) by 0 days.

(21) Appl. No.: 11/692,238

(22) Filed: Mar. 28, 2007

(65) Prior Publication Data

US 2007/0227607 A1    Oct. 4, 2007

(30) Foreign Application Priority Data

Mar. 28, 2006 (JP) ............................ 2006-089388
Mar. 23, 2007 (JP) ............................ 2007-076562

(51) Int. Cl.
*F16L 11/00* (2006.01)
(52) U.S. Cl. .................. 138/126; 138/137; 138/140; 138/141; 138/177; 428/36.91
(58) Field of Classification Search ............. 138/137, 138/141, 140, 125.126, DIG. 3, DIG. 7, 177; 428/36.2, 36.8, 36.91
See application file for complete search history.

(56) References Cited

U.S. PATENT DOCUMENTS

| 5,518,035 | A  | * | 5/1996  | Hoshishima et al. | ........ | 138/109 |
| 5,588,469 | A  | * | 12/1996 | Kakiuchi et al.   | ........ | 138/137 |
| 6,179,008 | B1 | * | 1/2001  | Kawazura et al.   | ........ | 138/125 |
| 6,391,963 | B1 | * | 5/2002  | Nishiyama         | ........ | 524/565 |
| 6,679,295 | B2 | * | 1/2004  | Daikai et al.     | ........ | 138/126 |
| 6,742,545 | B2 | * | 6/2004  | Fisher et al.     | ........ | 138/137 |
| 6,923,218 | B2 | * | 8/2005  | Kumagai et al.    | ........ | 138/109 |
| 6,935,378 | B2 | * | 8/2005  | Ikemoto et al.    | ........ | 138/121 |

FOREIGN PATENT DOCUMENTS

| JP | 11-090993   | 4/1999 |
| JP | 2002-054779 | 2/2002 |

* cited by examiner

*Primary Examiner*—Patrick F Brinson
(74) *Attorney, Agent, or Firm*—Andrus, Sceales, Starke & Sawall, LLP

(57) ABSTRACT

A resin composite fuel hose of a multilayer construction includes a resin layer as a barrier layer having a fuel permeation resistance, an inner rubber layer as an inner surface layer laminated on an inner side of the resin layer and an outer rubber layer laminated on an outer side of the resin layer. The outer rubber layer has a rubber hardness degree equal to or greater than that of the inner rubber layer, and the inner rubber layer has a permanent elongation equal to or less than 90%.

4 Claims, 7 Drawing Sheets

RESIN COMPOSITE FUEL HOSE

BACKGROUND OF THE INVENTION

1. Field of the Invention

The present invention relates to a resin composite fuel hose including a resin layer that is disposed in the middle of multilayer, has a permeation resistance to a fuel and serves as a barrier layer.

2. Description of the Related Art

For application of a fuel hose (fuel filler hose) transporting a fuel injected in a fuel inlet to a fuel tank in a motor vehicle, a typical rubber hose made of a blend of acrylonitrile-butadiene rubber and polyvinyl chloride (NBR/PVC blend, NBR+PVC) or the like has been conventionally used. Such rubber hose has a high vibration-absorbability, easiness of assembly, and an excellent permeation resistance to a fuel (gasoline).

However, recently, in view of global environmental conservation, regulations on restriction of permeation of motor vehicle fuel has been tightened, and demand for fuel permeation resistance is expected to increase more and more in future.

As a countermeasure against that, developed and used is a resin composite fuel hose including a resin layer that is laminated as an inner surface layer on an inner side of an outer rubber layer, has an excellent fuel permeation resistance and serves as a barrier layer.

However, the resin layer as the barrier layer is hard since resin is a material harder than rubber. So, in a hose including the resin layer laminated on an inner side of the outer rubber layer to an extreme end thereof (an axial end of the hose), when the hose is fitted on a mating pipe, a sealing property becomes insufficient due to poor bonding between the mating pipe and the resin layer that defines an inner surface of the hose.

And, since the resin layer defining the inner surface of the hose is hard and has a large deformation resistance, a great force is required for fitting or slipping the hose on the mating pipe. This causes a problem that easiness of connection of the hose and the mating pipe is impaired.

For the purpose of solution of the problem, a hose as shown in FIG. 5 is disclosed in Patent Document 1 below.

In the Figure, reference numeral 200 indicates a resin composite fuel hose (herein after just referred to as a hose), reference numeral 202 indicates an outer rubber layer, and reference numeral 204 is a resin layer that is laminated on an inner side of the outer rubber layer 202 as a barrier layer of an inner surface layer.

In the resin composite fuel hose 200, on an end portion thereof to be connected to a mating pipe 206 made of metal, the resin layer 204 is not laminated, and an inner surface of the outer rubber layer 202 is exposed so as to be fitted on the mating pipe 206 directly and elastically in contact relation.

And, in order to prevent a problem that a fuel flowing inside penetrates between the exposed inner surface of the outer rubber layer 202 and the mating pipe 206, and permeates outside through the end portion of the outer rubber layer 202 on which the resin layer 204 is not laminated, in the resin composite fuel hose 200, an annular grooved portion 208 is formed in an end portion of the resin layer 204, a ring-shaped elastic sealing member 210 made of a material such as fluoro rubber (FKM), and having high fuel permeation resistance is attached therein. The resin composite fuel hose 200 is fitted on the mating pipe 206 so as to elastically contact an inner surface of the elastic sealing member 210 with the mating pipe 206.

Meanwhile, reference numeral 212 indicates a bulge portion bulging annularly in a radially outward direction on a leading end portion of the mating pipe 206, reference numeral 214 indicates a hose clamp for fixing the end portion of the outer rubber layer 202 on the mating pipe 206 by tightening in a diametrically contracting direction an outer peripheral surface of the end portion of the outer rubber layer 202 on which the resin layer 204 is not laminated.

The hose clamp 214 has a tightening mechanism 234 including a screw 232 and a tightening band 230. As the screw 232 is tightened, the tightening band 230 is contracted to tighten an end portion of the hose 200 in a diametrically contracting direction, thereby the hose 200 is clamped on the mating pipe 206 in connecting relation.

In the hose 200 shown in FIG. 5, the resin layer 204 is not laminated on an end portion of the hose 200. Therefore, a great resistance of the resin layer 204 is not exerted when the hose 200 is fitted on the mating pipe 206, and thereby the hose 200 can be fitted thereon easily with a small force.

And, in the end portion of the resin composite fuel hose 200, the resin layer 204 is not formed, the inner surface of the outer rubber layer 202 having elasticity contacts directly with the mating pipe 206, and a good sealing property can be provided between the mating pipe 206 and a portion of the hose 200 fitted thereon.

By the way, the fuel hose typically has a predetermined curved shape since the fuel hose has to be arranged so as not to interfere with peripheral parts and components.

A typical rubber hose of such curved shape is produced in a following manner as disclosed in Patent Document 2 below. An elongated and straight tubular rubber hose body is formed by extrusion, and the elongated and straight tubular rubber hose body is cut to a predetermined length to obtain a straight tubular rubber hose body 216 that is not vulcanized (or is semivulcanized). Then, as shown in FIG. 6, the straight tubular rubber hose body 216 is fitted on a mandrel 218 that is made of metal and has a predetermined curved shape to be deformed into a curved shape. Before molding or fitting, a mold release agent is applied to a surface of the mandrel 218. The curved tubular rubber hose body 216 is vulcanized with being fitted on the mandrel 218 by heating for a predetermined time. When vulcanization is completed, the hose 220 of curved shape is removed from the mandrel 218, and washed, thereby the hose 220 of curved shape as a finished product can be obtained.

However, in case of the hose 200 shown in FIG. 5, such production method cannot be employed. In case of the hose 200 shown in FIG. 5, first of all, the outer rubber layer 202 is solely formed by injection molding, and then the resin layer 204 is formed on the inner surface of the outer rubber layer 202 so as to follow a shape of the inner surface thereof.

For formation of the resin layer 204 so as to follow the shape of the inner surface of the outer rubber layer 202, electrostatic coating means is suitably applied.

The electrostatic coating is applied in such manner that an injection nozzle is inserted inside a hose, specifically inside the outer rubber layer 202, and resin powder is sprayed from the injection nozzle onto an inner surface of the hose, thereby the inner surface of the outer rubber layer 202 is electrostatically coated with the resin powder.

In the electrostatic coating, a resin membrane is formed in such manner that negatively or positively charged resin powder (typically, negatively charged resin powder) is sprayed from the injection nozzle, and the resin powder flies to and is attached to the inner surface of the outer rubber layer 202 as counter electrode (positive electrode) by electrostatic field.

In steps of such an electrostatic coating, in order to form the resin layer 204 with an intended thickness, usually, more than one cycles of electrostatic coating are performed.

Specifically, after the resin powder is attached on the inner surface of the outer rubber layer 202, the resin powder is melted by heating and then cooled. Then, another resin powder is attached on the resin powder by further spraying the resin powder thereto by an electrostatic coating and the another resin powder is melted by heating and then cooled. In this manner, the cycle of electrostatic coating is repeated until the resin layer 204 with an intended wall thickness is formed.

In this case, overall production steps are as follows.

First, the outer rubber layer 202 is formed by injection molding. Then, the outer rubber layer 202 is dried, washed in pretreatment process and dried again. Subsequently, resin powder is attached to an inner surface of the outer rubber layer 202 by electrostatic coating. The resin powder thereon is melted by heating and then cooled. After that, a second cycle of the electrostatic coating (attaching by electrostatic coating, melting and cooling of resin powder) is performed, and this cycle (attaching by electrostatic coating, melting and cooling of resin powder) is repeated to obtain the resin layer 204 with the intended wall-thickness. After the resin layer 204 is completed, a ring-shaped elastic sealing member 210 having fuel permeation resistance is inserted through an axial end of the outer rubber layer 202 to be placed in a predetermined position.

As stated above, a number of steps are required for producing the resin hose 200 shown in FIG. 5, and therefore, production cost of the hose 200 is necessarily increased.

Accordingly, inventors of the present invention devised a resin composite fuel hose of a multilayer construction in which an inner rubber layer is further laminated on an inner side of a resin layer as an inner surface layer.

The resin composite fuel hose of the multilayer construction can be provided with permeation resistance (barrier property) to a transported fluid by the resin layer. Further, the inner rubber layer that defines an inner surface of the resin composite fuel hose is elastically deformed when the resin composite fuel hose is fitted on a mating pipe. During that time, a force required for fitting the hose on the mating pipe can be decreased.

And, since the resin composite fuel hose is connected to the mating pipe so as to elastically contact the inner rubber layer with the mating pipe, a good sealing property can be provided between the mating pipe and a portion of the resin composite fuel hose connected thereto.

And, in the resin composite fuel hose of the multilayer construction, since the resin layer can be formed to an axial edge of the hose, an expensive ring-shaped sealing member 210 having high permeation resistance to a transported fluid as shown in FIG. 5 can be omitted.

In addition, in the resin composite fuel hose of the multilayer construction, since the resin layer can be formed to the axial edge of the hose, it becomes possible to produce the hose in the same production method as shown in FIG. 6.

Specifically, a straight tubular hose body is formed with a multilayer construction by successively laminating the inner rubber layer, the resin layer and the outer rubber layer on one another by extrusion. The straight tubular hose body is unvulcanized or semivulcanized. Then, the straight tubular hose body is fitted on a mandrel that has a predetermined curved shape to be deformed, the curved tubular hose body with being fitted on the mandrel is vulcanized by heating, and thereby a resin composite fuel hose of curved portion can be obtained.

In this production method, it becomes possible to produce a resin composite fuel hose at much lower cost than before.

However, in the fuel hose of multilayer construction comprising rubber-resin-rubber layers, a hard resin layer in the middle of the layers is formed to an axial extreme end of the hose. Therefore, when the hose is fitted on the mating pipe and an outer peripheral surface of an end portion of the hose is tightened by a hose clamp to clamp or lock the end portion of the hose to the mating pipe in connecting relation, a tightening force or clamping force by the hose clamp is obstructed by the middle resin layer. And, the clamping force is not transmitted favorably or suitably to the inner rubber layer, the inner rubber layer does not exert the clamping force sufficiently to the mating pipe, resulting in leakage of a transported fluid.

And, even supposing that the hose is tightened to the mating pipe with sufficient tightening force initially, the inner rubber layer fatigues and is subject to stress relaxation due to aging. At that time, since the tightening force by the hose clamp is hard to be exerted to the inner rubber layer, a sealing pressure of the hose to the mating pipe is not applied sufficiently, resulting in leakage of the transported fluid. Further, due to lack of the tightening force in an early period or after a certain period of time, resulting also in lowered fuel permeation resistance.

Since the inner rubber layer is disposed on an inner side of the resin layer, the hose can be fitted on the mating pipe more easily due to elastic deformation of the inner rubber layer, compared to a hose in which an innermost layer is constructed by a resin layer. However, the resin layer that is formed to the extreme end of the hose provides a resistance to fitting of the hose. Namely, inherent in this type is a problem that easiness of fitting of the hose, namely easiness of connection of the hose is not so good.

[Patent Document 1] JP-A, 2002-54779

[Patent Document 2] JP-A, 11-90993

Under the foregoing circumstances, it is an object of the present invention to provide a resin composite fuel hose including a resin layer in the middle of layers, in which a sufficient tightening force to a mating pipe can be ensured by a clamp force of a hose clamp that is favorably exerted to an inner rubber layer for a long period as well as an early period after the hose is connected to the mating pipe whereby a sealing property and a fuel permeation resistance are enhanced, and easiness of fitting of the hose to the mating pipe is also ensured.

SUMMARY OF THE INVENTION

According to the present invention, there is provided a novel resin composite fuel hose of a multilayer construction. The resin composite fuel hose of a multilayer construction comprises a resin layer having permeation resistance to a fuel and serving as a barrier layer, an inner rubber layer as an inner surface layer laminated on an inner side of the resin layer and an outer rubber layer laminated on an outer side of the resin layer. The outer rubber layer has a rubber hardness degree equal to or greater than that of the inner rubber layer, and the inner rubber layer has a permanent elongation or permanent elongation rate equal to or less than 90% according to Japan Industrial Standard (JIS)K6262.

According to one aspect of the present invention, the inner rubber layer has a rubber hardness degree in a range of 65 to 80 according to a durometer hardness test (type A) of JISK6253.

According to one aspect of the present invention, the outer rubber layer has a rubber hardness degree in a range of 65 to 85 according to a durometer hardness test (type A) of JISK6253.

As stated above, in the present invention, the resin composite fuel hose of a multilayer construction comprises the resin layer with fuel permeation resistance as the barrier layer, the inner rubber layer as the inner surface layer on the inner side of the resin layer and the outer rubber layer on the outer side of the resin layer, the rubber hardness degree of the outer rubber layer is set equal to or greater than that of the inner rubber layer, and the permanent elongation or permanent elongation rate of the inner rubber layer is set equal to or less than 90%.

Here, the rubber hardness degree is measured by a durometer type A (spring scale) according to JISK6253.

And, the permanent elongation of the inner rubber layer is an index indicating its fatigue property or sag property. The permanent elongation is determined or stipulated as follows.

Here, the permanent elongation means a permanent elongation (a permanent elongation rate) according to JISK6262, namely a permanent elongation of a test specimen after being held at 100° C. for 72 hours under constant elongation by 50% of its original length. The test specimen in a form of No. 7 according to JIS K6251 is taken from a product or a sheet sample.

According to the present invention, when the outer rubber layer is tightened by the hose claim in a diametrically contracting direction for connecting the fuel hose to the mating pipe, the tightening force can be favorably transmitted to the inner rubber layer, thereby the fuel hose can be connected to the mating pipe under a good or sufficient tightening force.

Thereby successfully solved is a problem that sealing property is lowered and fuel permeation resistance is impaired due to lack of tightening force during connection of the fuel hose with the mating pipe.

Further, the fuel hose can be easily fitted on the mating pipe with a small force.

And, since the permanent elongation of the inner rubber layer is set equal to or less than 90%, it is prevented over a long period of time that the tightening force is decreased due to fatigue of the inner rubber layer and thereby the sealing pressure is lowered and the fuel permeation resistance is impaired.

Meanwhile, in the present invention, each of the inner rubber layer and the outer rubber layer may be constructed by a single rubber layer or by laminating more than one rubber layers on one another. Also, one of the inner rubber layer and the outer rubber layer may be constructed by a single rubber layer, and the other thereof may be constructed by laminating more than one rubber layers.

In the present invention, the rubber hardness degree of the inner rubber layer may be set in the range of 65 to 80 according to the durometer hardness test (type A) of JISK6253.

When the rubber hardness degree of the inner rubber layer exceeds 80, the inner rubber layer is too hard to favorably transmit the clamping force by the hose clamp to the mating pipe or the inner rubber layer and to be deformed so as to follow a shape of the mating pipe, whereby the sealing becomes insufficient, and a considerable force is required for fitting of the hose to the mating pipe resulting in less easiness of fitting of the hose.

On the other hand, when the rubber hardness degree of the inner rubber layer is smaller than 65, the tightening force at a connecting portion with a mating member or the mating pipe is insufficient, and a pullout resistance with respect to the mating member or the mating pipe in case of vehicle collision is impaired.

In the present invention, the rubber hardness degree of the outer rubber layer is set preferably in the range of 65 to 85 according to the durometer hardness test (type A) of JISK6253.

When the rubber hardness degree of the outer rubber layer exceeds 85, the outer rubber layer is hard and breakable, and properties or physical properties such as ozone resistance, tear resistance, and low-temperature resistance are impaired. Therefore, the rubber hardness degree of the outer rubber layer is set preferably up to 85.

On the other hand, when the rubber hardness degree of the outer rubber layer is smaller than 65, the outer rubber layer is more flexible than necessary. When an outer peripheral surface of the outer rubber layer or the hose is tightened by the hose clamp, the clamping force is absorbed only by the outer rubber layer and the tightening force is hard to be transmitted to the inner rubber layer through the middle resin layer.

Now, the preferred embodiments of the present invention will be described in detail with reference to the drawings.

DETAILED DESCRIPTIONS OF PREFERRED EMBODIMENTS

Figure 1:
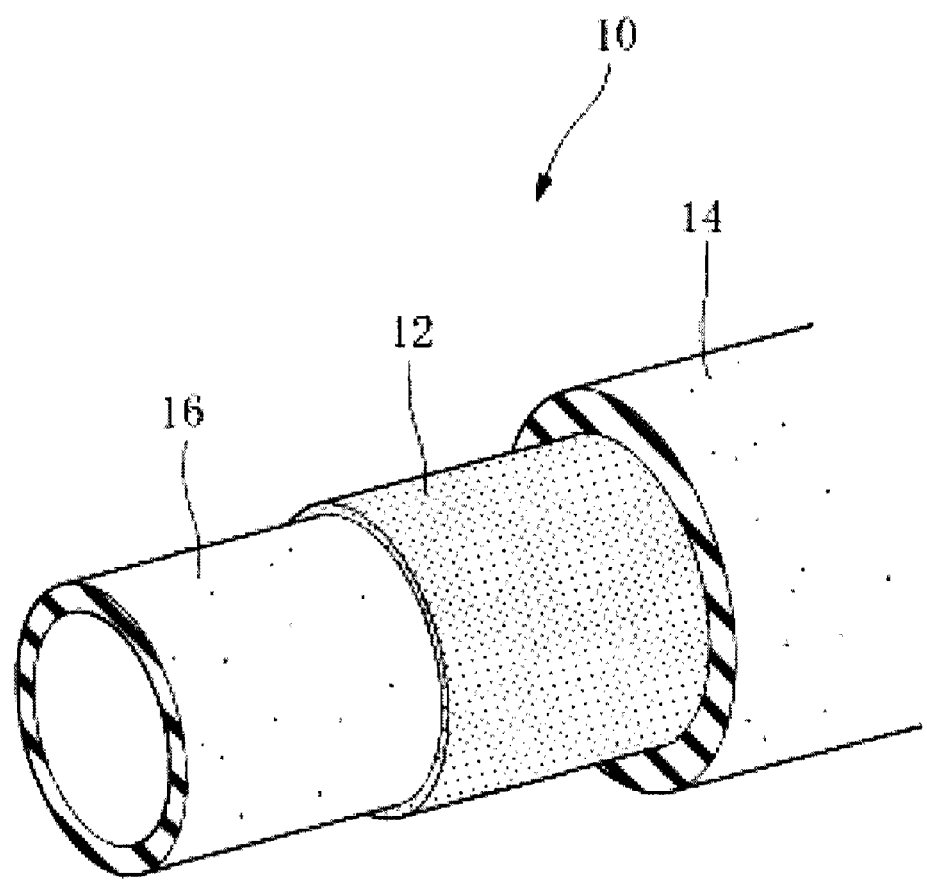
FIG. 1 is a perspective view of a resin composite fuel hose according to the present invention, shown partly broken away.
Figure 2A:
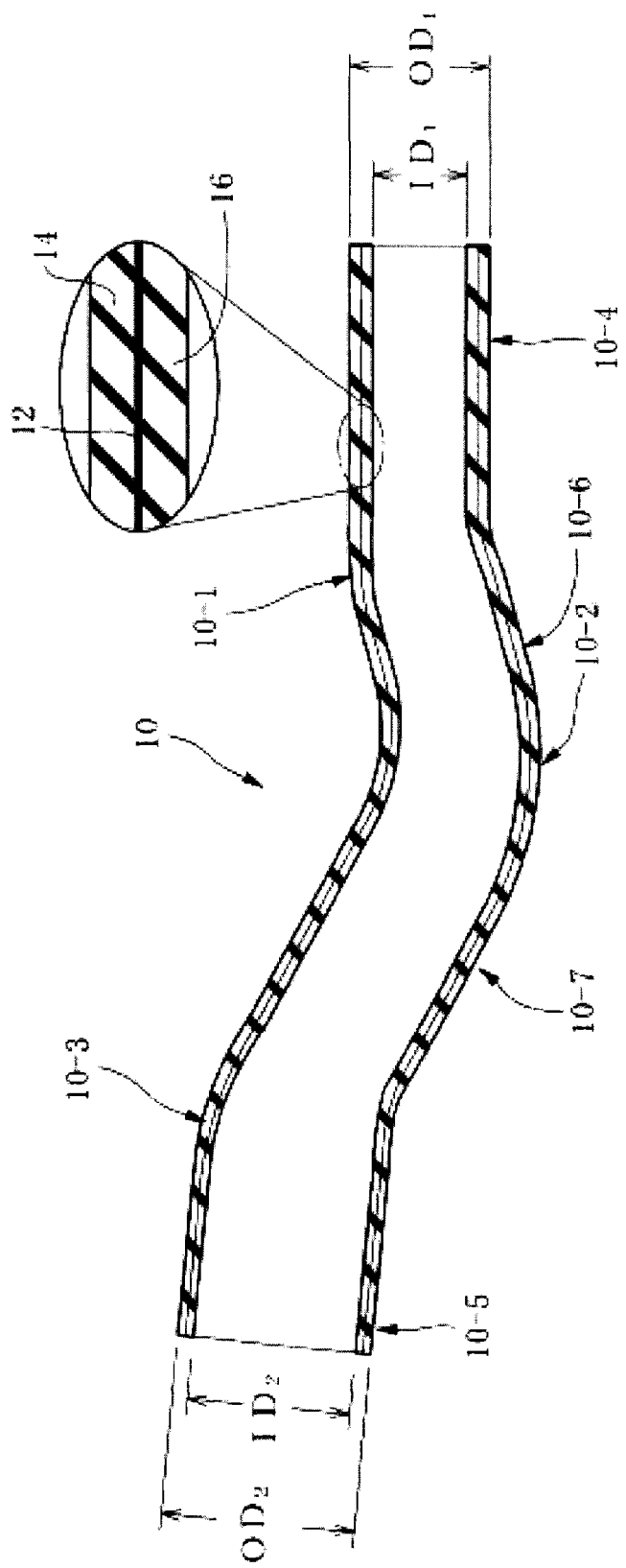
FIG. 2A is an overall sectional view of the resin composite fuel hose of FIG. 1.
Figure 2B:
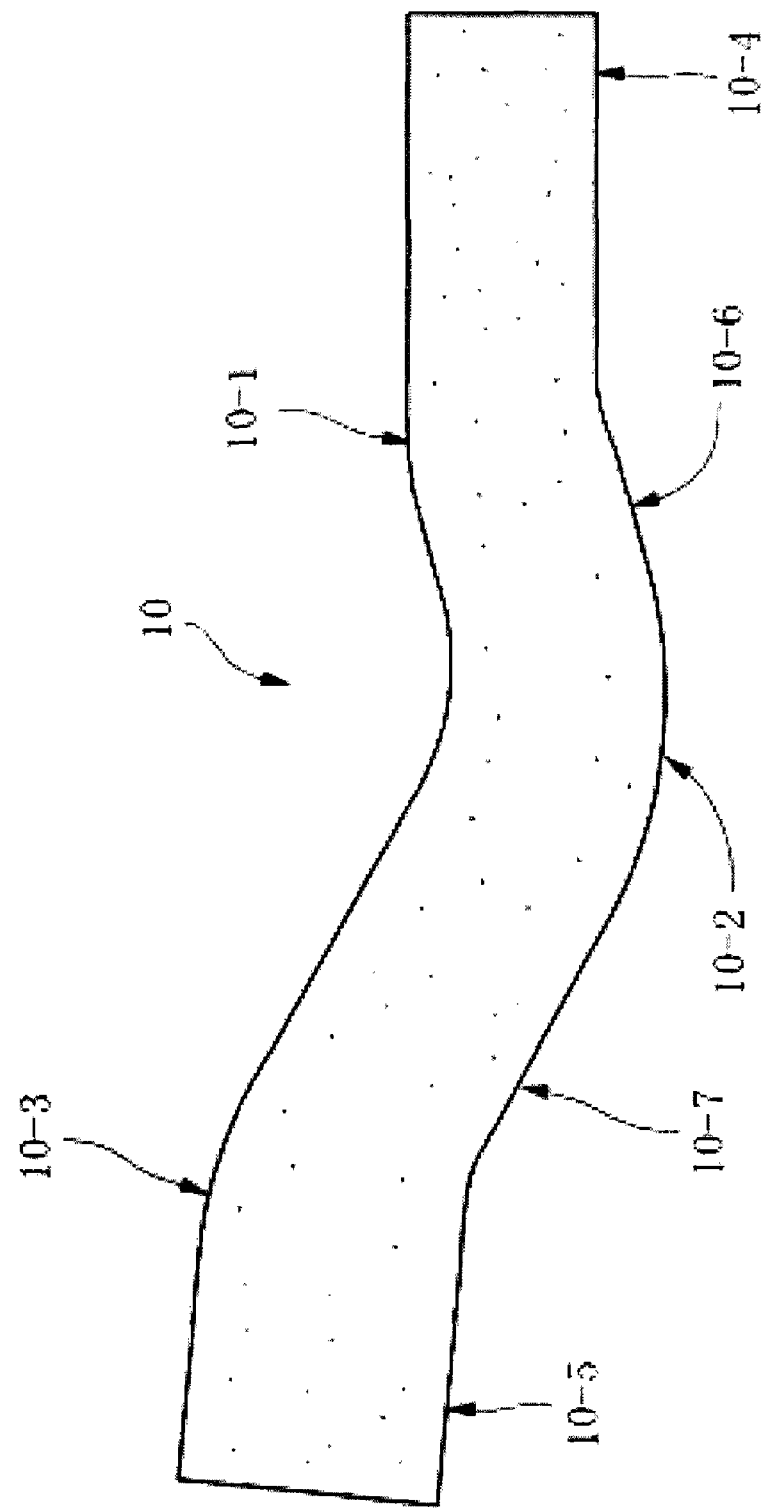
FIG. 2B is an overall side view of the resin composite fuel hose of FIG. 1.

In FIGS. 1 and 2, reference numeral 10 indicates a fuel hose or fuel transporting hose (filler hose, hereinafter simply referred to as a hose) for transporting a fuel injected in a fuel inlet to a fuel tank in a motor vehicle. The hose 10 has multilayer construction comprising a resin layer 12 as a barrier layer having a permeation resistance to a transported fluid, an outer rubber layer 14 on an outer side of the resin layer 12, and an inner rubber layer 16 as an inner surface layer on an inner side of the resin layer 12.

Here, the resin layer 12 in the middle of the layers is formed to extend from one axial end to the other axial end of the hose, or to extend from one axial edge portion to the other axial edge portion thereof.

The hose 10 entirely has a curved or bent shape.

Specifically, the hose 10 has curved portions 10-1, 10-2 and 10-3 at predetermined axial positions of the hose 10. And, the hose 10 has straight portions or straight tubular portions (portions extending straight in the axial direction of the hose 10) 10-4, 10-5, 10-6 and 10-7 that are defined by axially opposite end portions of the hose 10, a portion between the curved portions 10-1 and 10-2 of the hose 10, and a portion between the curved portions 10-2 and 10-3 of the hose 10, respectively.

An inner diameter $ID_2$ and an outer diameter $OD_2$ of one axial end portion of the hose 10 are larger than an inner diameter $ID_1$ and an outer diameter $OD_1$ of the other axial end portion thereof, respectively.

In this embodiment, in the hose 10, each of the curved portions 10-1, 10-2 and 10-3 progressively and continuously increases both in the inner and outer diameters as approaching in the left direction in FIG. 2.

In this embodiment, acrylonitrile butadiene rubber (NBR) is used for the inner rubber layer 16, fluorothermoplastic copolymer consisting of at least three monomers, tetrafluoroethylene, hexafluoropropylene, and vinylidene (THV) is used for the resin layer 12, and NBR+PVC is used for the outer rubber layer 14.

Here, bonding strength between the layers (one and an adjacent layers) equal to or greater than 10N/25 mm, and the layers are bonded to each other firmly. In each of samples evaluated with respect to bonding strength, peel-off does not occur on an interface of each layer, but a parent material is destroyed. The resin layer 12 and the inner rubber layer 16, the resin layer 12 and the outer rubber layer 14 are bonded to one another by vulcanizing bonding, respectively, but may be also bonded to one another by adhesive.

The inner rubber layer 16, the resin layer 12 and the outer rubber layer 14 may be made or constructed of the following materials, as well as the combination of the above materials.

Specifically, for the inner rubber layer 16, materials such as NBR (acrylonitrile content is equal to or greater than 30% by mass), NBR+PVC (acrylonitrile content is equal to or greater than 30% by mass), FKM, hydrogenated acrylonitrile butadiene rubber (H-NBR) may be suitably used.

A wall-thickness of the inner rubber layer 16 may be around 1.0 to 2.5 mm.

For the resin layer 12 as a middle layer, materials such as THV, a polyvinylidene fluoride (PVDF), ethylene-tetrafluoroethylene copolymer (ETFE), polychlorotrifluoroethylene (CTFE), ethylene-vinyl alcohol (EVOH), polybutylene naphthalate (PBN), polybutylene terephtharate (PBT), polyphenylene sulfide (PPS) are suitably used.

A wall thickness of the resin layer 12 may be about 0.03 to 0.3 mm.

THV is flexible compared to EVOH and PVDF, and suitable for a barrier material for a hose with layers of resin and rubber. In comparison with Polytetrafluoroethylene (PTFE) and EVOH, ETFE and THV are easily extruded, easily laminated to a rubber, and have excellent adhesion to rubber.

On the other hand, PBN and PBT are less flexible compared to THV. However, PBN and PBT are excellent in fuel permeation resistance, and can be thin-walled compared to THV. Therefore, a flexible hose can be formed also from PBN and PBT, similarly from THV.

On the other hand, for the outer rubber layer 14, materials such as NBR+PVC, epichlorohydrin-ethylene oxide copolymer (ECO), chlorosulponated polyethylene rubber (CSM), NBR+acrylic rubber (NBR+ACM), NBR+ethylene-propylene-diene rubber (NBR+EPDM), and EPDM may be suitably used.

A wall thickness of the outer rubber layer 14 may be about 1.0 to 3.0 mm.

In this embodiment, the outer rubber layer 14 has a rubber hardness degree in a range of 65 to 85, the inner rubber layer 16 has a rubber hardness degree in a range of 65 to 80, and the rubber hardness degree of the outer rubber layer 14 is equal to or greater than that of the inner rubber layer 16.

Further, the inner rubber layer 16 has a permanent elongation or permanent elongation rate equal to or less than 90%.

Figure 3:
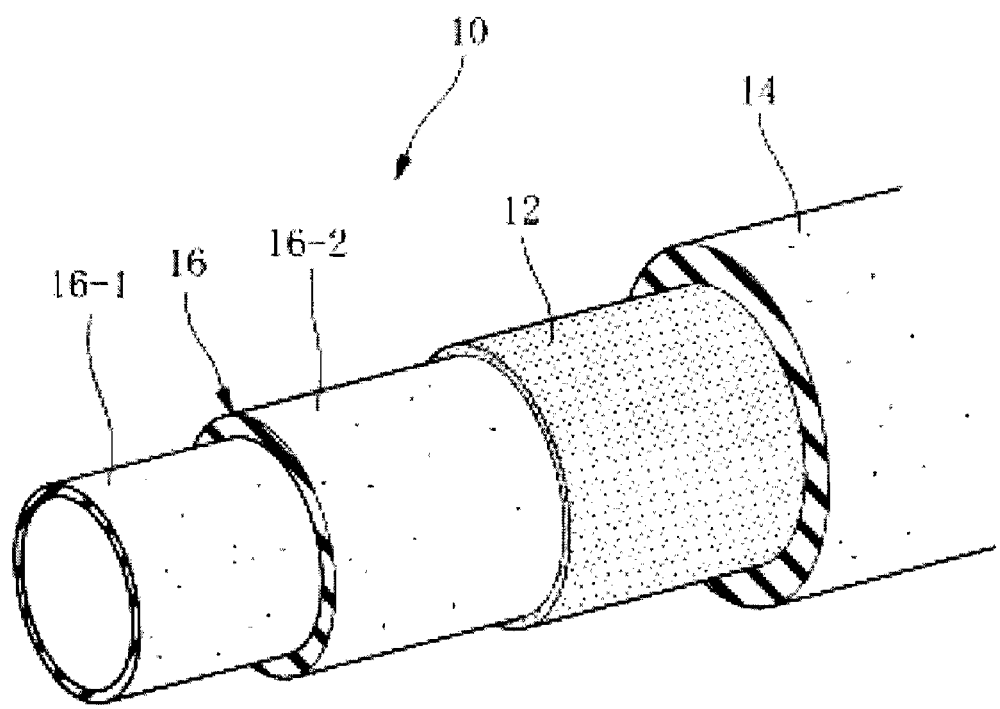
FIG. 3 is a perspective view of a modified resin composite fuel hose according to the present invention.

According to this embodiment, in the hose 10, the inner rubber layer 16 comprises a single layer. However, as shown in FIG. 3, the inner rubber layer 16 may have a two-layer construction that comprises a first layer (rubber layer) 16-1 defining an innermost surface and a second layer (rubber layer) 16-2 on an outer side of the first layer 16-1.

In this four-layer hose 10, bonding strength between the layers (one and adjacent layers) is equal to or greater than 10N/25 mm, and the layers are bonded to each other firmly. In each of samples evaluated with respect to bonding strength, peel-off does not occur on an interface of each layer, but a parent material is destroyed. The resin layer 12 and the second layer 16-2, the resin layer 12 and the outer rubber layer 14 are bonded to one another by vulcanizing bonding, respectively, but may be also bonded to one another by adhesive.

In this four-layer hose 10, materials for the layers may be combined as follows.

For the first layer 16-1, materials such as FKM, NBR (acrylonitrile content is equal to or greater than 30% by mass), NBR+PVC (acrylonitrile content is equal to or greater than 30% by mass) may be suitably used.

A wall-thickness of the first layer 16-1 may be around 0.2 to 1.0 mm.

On the other hand, for the second layer 16-2, materials such as NBR (acrylonitrile content is equal to or greater than 30% by mass) or NBR+PVC (acrylonitrile content is equal to or greater than 30% by mass) may be suitably used.

A wall-thickness of the second layer 16-2 may be around 1 to 2 mm.

The resin layer 12 in the middle of the layers and the outer rubber layer 14 may be formed as stated above.

In particular, preferably, FKM having an excellent gasoline permeation resistance is used for the first layer 16-1. By making the first layer 16-1 of FKM, can be ensured not only a fuel permeation restraining function served by the resin layer 12 but also an end permeation preventing function for effectively preventing that a fuel permeates through an inner surface layer, then permeates out of an axial edge of the hose 10 at an axial end portion of the hose 10 to which a mating member such as a mating pipe is connected. For the purpose of ensuring easy connection of the hose 10 and the mating pipe or the like, the inner rubber layer 16 has a wall-thickness of equal to or greater than 1 mm. However, when the inner rubber layer 16 is entirely made of FKM, a cost of the hose 10 is increased. So, due to cost reason, for the second layer 16-2, inexpensive NBR (acrylonitrile content is equal to or greater than 30% by mass) or inexpensive NBR+PVC (acrylonitrile content is equal to or greater than 30% by mass) is used.

In the embodiment shown in FIG. 3, the outer rubber layer 14 has the rubber hardness degree in the range of 65 to 85, and the inner rubber layer 16, specifically each of the first layer 16-1 and the second layer 16-2 has the rubber hardness degree in the range of 65 to 80. And, the outer rubber layer 14 has the rubber hardness degree equal to or greater than that of the inner rubber layer 16, specifically equal to or greater than that of the first layer 16-1 and equal to or greater than that of the second layer 16-2.

And, each of the first layer 16-1 and the second layer 16-2 has the permanent elongation or the permanent elongation rate equal to or less than 90%.

Figure 4:
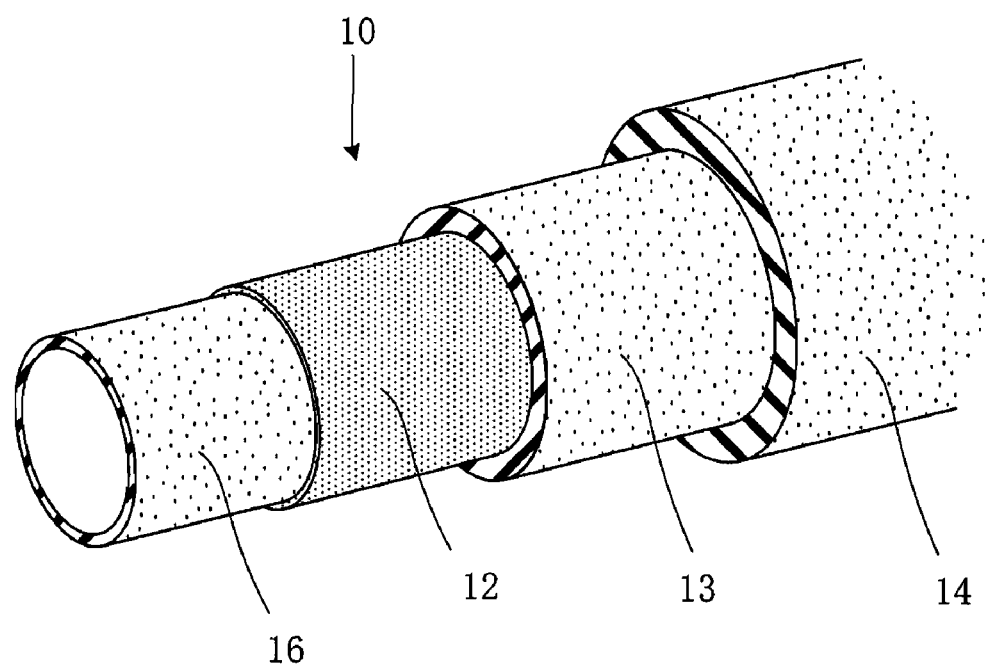
FIG. 4 is a perspective view of another modified resin composite fuel hose according to the present invention.
Figure 5A:
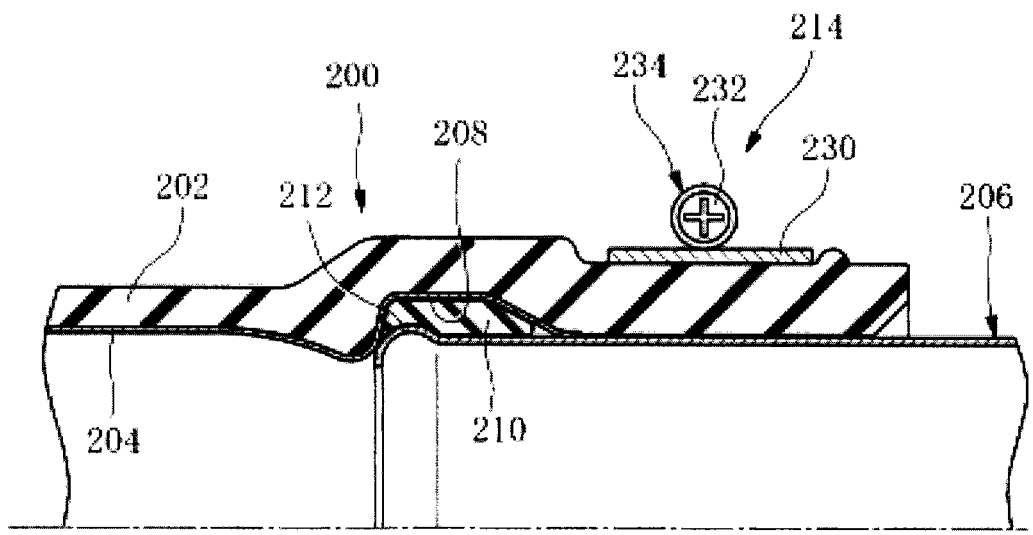
FIG. 5A is a sectional view of a conventional resin composite fuel hose.
Figure 5B:
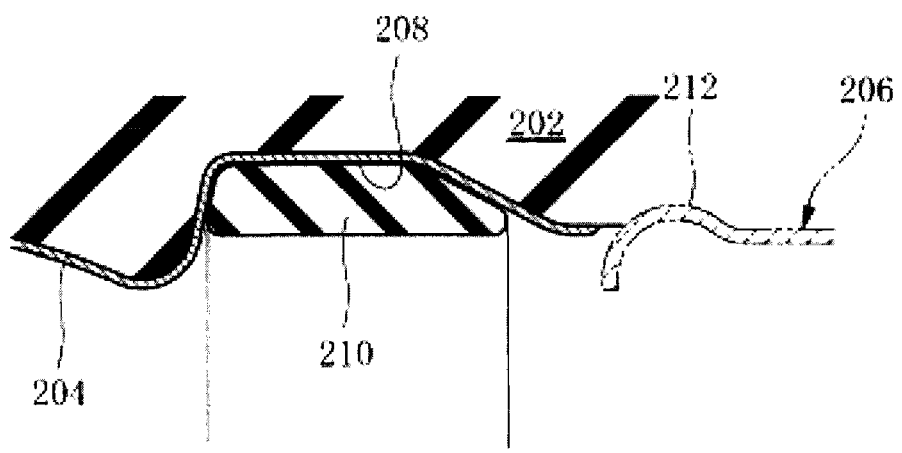
FIG. 5B is an enlarged view of a part of the conventional resin composite fuel hose of FIG. 5A.
Figure 6:
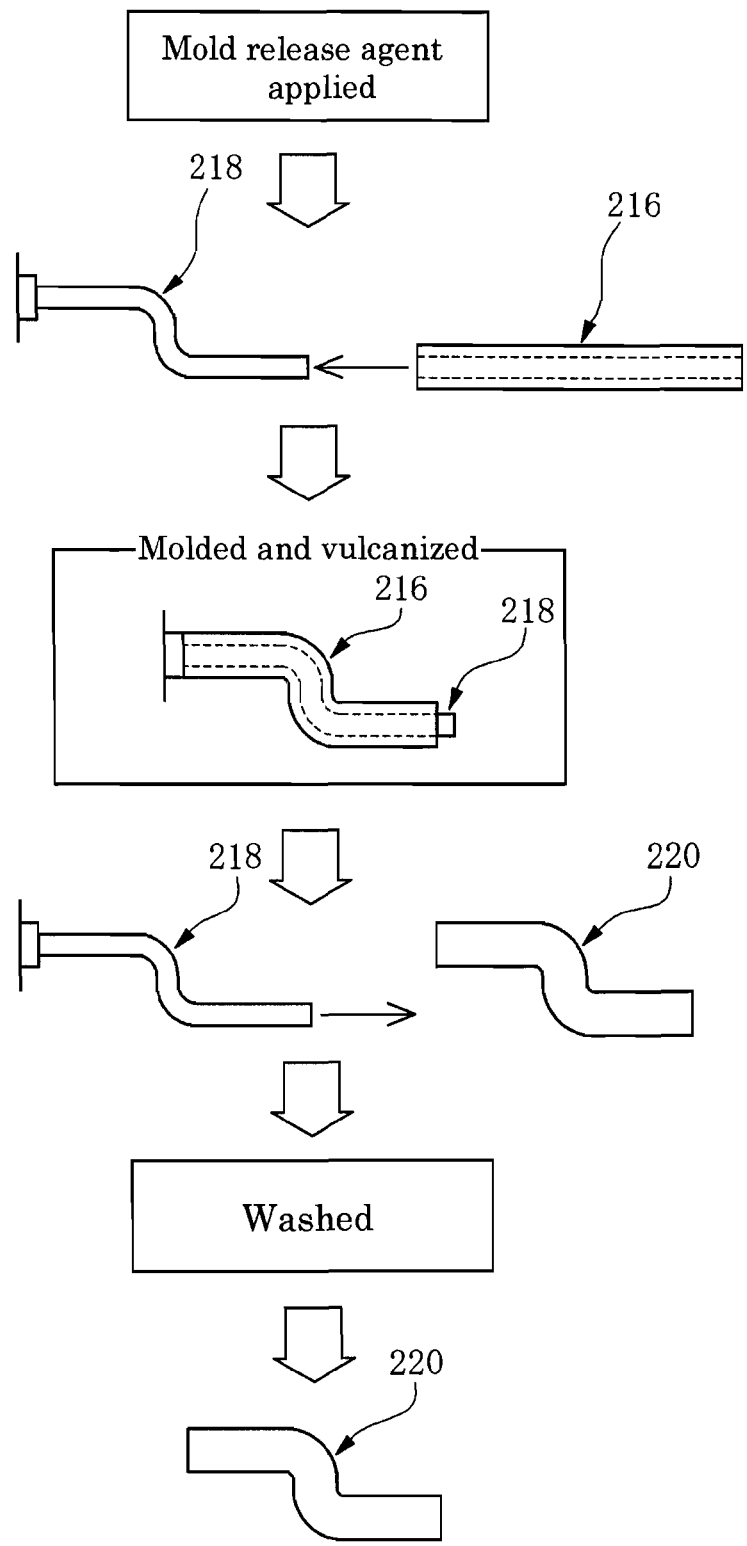
FIG. 6 is a view showing a typical production method for producing a conventional resin composite fuel hose of curved shape.

As shown in FIG. 4, the hose 10 may have a multilayer construction including a middle rubber layer 13 between the resin layer 12 and the outer rubber layer 14 (the middle rubber layer 13 may be regarded as a first layer of an outer rubber layer and the outer rubber layer 14 may be regarded as a second layer of the outer rubber layer).

In the hose 10 having the four-layer construction of FIG. 4, bonding strength between the layers (one and adjacent layers) is equal to or greater than 10N/25 mm, and the layers are bonded to one another firmly. In each of samples evaluated with respect to bonding strength, peel-off does not occur on an interface of each layer, but a parent material is destroyed. The resin layer 12 and the inner rubber layer 16, the resin layer 12 and the middle rubber layer 13 are bonded to one another by vulcanizing bonding, respectively, but may be also bonded to one another by adhesive.

In the hose 10 having the four-layer construction of FIG. 4, the inner rubber layer 16, the resin layer 12, the middle rubber layer 13 and the outer rubber layer 14 may be constructed in combination of the following materials.

For the inner rubber layer 16, materials such as FKM, NBR (acrylonitrile content is equal to or greater than 30% by mass), NBR+PVC (acrylonitrile content is equal to or greater than 30% by mass) may be suitably used.

A wall-thickness of the inner rubber layer 16 may be about 0.2 to 1.0 mm.

For the resin layer 12 as a middle layer, fluoro type resin such as THV, PVDF or ETFE, and polyamide (PA) or nylon resin such as PA6, PA66, PA11 or PA12 may be suitably used.

A wall-thickness of the resin layer 12 may be about 0.03 to 0.3 mm.

On the other hand, for the middle rubber layer 13, NBR (acrylonitrile content is equal to or greater than 30% by mass), NBR+PVC (acrylonitrile content is equal to or greater than 30% by mass), ECO, CSM, NBR+ACM, NBR+EPDM, butyl rubber (IIR), EPDM+IIR, or EPDM may be suitably used.

A wall-thickness of the middle rubber layer 13 may be about 0.2 to 2.0 mm.

For the outer rubber layer 14, materials such as NBR (acrylonitrile content is equal to or greater than 30% by mass), NBR+PVC (acrylonitrile content is equal to or greater than 30% by mass), ECO, CSM, NBR+ACM, NBR+EPDM, IIR, EPDM+IIR, and EPDM may be suitably used.

A wall-thickness of the outer rubber layer 14 may be about 1 to 3 mm.

Meanwhile, total wall-thickness, namely a suitable wall-thickness of the hose 10 of FIG. 4 is about 2.5 to 6.0 mm. When the wall-thickness of the hose 10 is less than 2.5 mm, a gasoline permeation resistance of the hose 10 is insufficient. When the wall-thickness of the hose 10 is greater than 6 mm, a flexibility of the hose 10 is insufficient.

In the embodiment shown in FIG. 4, the outer rubber layer 14 has the rubber hardness degree in the range of 65 to 85, and the inner rubber layer 16 has the rubber hardness degree in the range of 65 to 80. And, the outer rubber layer 14 has the rubber hardness degree equal to or greater than that of the inner rubber layer 16. The middle rubber layer 13 has the rubber hardness degree in the range of 60 to 85, equal to or greater than that of the inner rubber layer 16.

And, the inner rubber layer 16 has the permanent elongation or the permanent elongation rate equal to or less than 90%.

Here, when the outer rubber layer 14 (the second layer of the outer rubber layer) or the middle rubber layer 13 (the first layer of the outer rubber layer) is made of IIR or EPDM+IIR, the outer rubber layer 14 or the middle rubber layer 13 is provided with a gasoline fuel permeation resistance, and serves as a barrier layer since IIR and EPDM+IIR have alcohol resistance. Therefore, even when the resin layer 12 is formed thin-walled to enhance flexibility or elasticity of the hose 10, gasoline fuel permeation resistance of the hose 10 does not become insufficient. And, even when the resin layer 12 is made of inexpensive PA or nylon resin instead of fluoro type resin having an excellent gasoline permeation resistance, sufficient gasoline fuel permeation resistance of the hose 10 can be maintained.

Then, the test samples of hoses including middle rubber layers made of IIR are evaluated with respect to a gasoline permeation resistance and the results are shown in Table 1.

The evaluation is conducted in the following manner. Four test samples or specimens of hoses (A), (B), (C) and (D), each having an inner diameter of 24.4 mm, a wall-thickness of 4 mm, and a length of 300 mm, are prepared. The test sample (A) has a three-layer construction including an inner rubber layer of NBR, a resin layer of THV815 (THV815 is a product number of a product commercially available under the trademark Dyneon from Dyneon LLC), and an outer rubber layer of NBR+PVC, the test sample (B) has a four-layer construction including an inner rubber layer of NBR, a resin layer of THV (THV815, wall-thickness 0.11 mm), a middle rubber layer of IIR (a first layer of an outer rubber layer) and an outer rubber layer of NBR+PVC (a second layer of the outer rubber layer), the test sample (C) has a four-layer construction including an inner rubber layer of NBR, a resin layer of THV (THV815, wall-thickness 0.08 mm), a middle rubber layer of IIR (a first layer of an outer rubber layer) and an outer rubber layer of NBR+PVC (a second layer of the outer rubber layer), and the test sample (D) has a four-layer construction including an inner rubber layer of NBR, a resin layer of nylon (PA11), a middle rubber layer of IIR (a first layer of an outer rubber layer) and an outer rubber layer of NBR+PVC (a second layer of the outer rubber layer). In the columns of "Specimen" and "Wall-thickness" of Table 1, materials and wall-thicknesses only of the resin layers and the middle rubber layers (materials and wall-thicknesses only of the resin layer and the outer rubber layer of the test sample (A)) are indicated, respectively. In each of the test samples (A), (B), (C) and (D), a round-chamfered metal pipe of an outer diameter of 25.4 mm provided with two bulge portions (maximum outer diameter of 27.4 mm) is press-fitted in each end portion thereof, and one of the metal pipes is closed with a plug. And, a test fluid (Fuel C+ethanol (E) 10 volume %) is supplied in each of the test samples (A), (B), (C) and (D) via the other of the metal pipes, and the other of the metal pipes is closed with a plug of screw type to enclose the test fluid in each of the test samples (A), (B), (C) and (D). Then, each of the test samples (A), (B), (C) and (D) is allowed to stand at 40° C. for 3000 hours (the test fluid is replaced every 168 hours). Then, permeation amount of carbon hydride (HC) is measured with respect to each of the test samples (A), (B), (C) and (D) every day for three days based on DBL (Diurnal Breathing Loss) pattern by a SHED (Sealed Housing for Evaporative Detection) method according to CARB (California Air Resources Board). With regard to each of the test samples (A), (B), (C) and (D), applied is a permeation amount on a day when a maxim permeation amount is detected.

TABLE 1

|  | A | B | C | D |
|---|---|---|---|---|
| Specimen | [1]THV815/ NBR + PVC | THV815/IIR | THV815/IIR | PA11/IIR |
| Wall-thickness (mm) | 0.11/2.16 | 0.11/1.9 | 0.08/1.9 | 0.20/1.9 |

TABLE 1-continued

|  | A | B | C | D |
|---|---|---|---|---|
| Permeation amount (mg/hose) | 4.2 | 2.7 | 4.2 | 3.8 |

Note:
*1)THV815 is a product number of a product commercially available under the trademark Dyneon from Dyneon LLC.

As appreciated from the results of Table 1, the permeation amount of HC is the same, namely 4.2 mg/hose, between the test sample (A) including the outer rubber layer made of NBR+PVC and the test sample (C) including the middle rubber layer made of IIR. However, in terms of a wall-thickness of the resin layer, the test sample (A) includes the resin layer of a wall-thickness 0.11 mm that is greater than the wall-thickness 0.08 mm of the test sample (C). Therefore, when a hose includes a rubber layer made of IIR, an equivalent gasoline permeation resistance can be ensured by constructing a resin layer with a wall-thickness decreased by about 30%. Between the test sample (A) including the outer rubber layer made of NBR+PVC and the test sample (B) including the middle rubber layer made of IIR, a wall-thickness of the resin layer is the same, 0.11 mm. However, the permeation amount of HC is different, namely 4.2 mg/hose in the test sample (A) and 2.7 mg/hose in the test sample (B). When a hose includes a resin layer of an identical wall-thickness, HC permeation resistance can be decreased by about 35% by making a rubber layer of IIR. Further, in the test sample (D) including the middle rubber layer made of IIR and the resin layer made of PA11, a permeation amount of HC can be decreased by about 10% compared to the test sample (A) by increasing the wall-thickness of the resin layer by about 80%. This evaluation can basically apply also to a hose including a middle rubber layer made of EPDM+IIR.

As such, when a hose is constructed with four layers by combining materials suitably selected from the above, a permeation resistance to a transported fluid can be further enhanced, a resistance to a sour gasoline can be further enhanced, or a heat resistance or a resistance to alcohol gasoline can be also enhanced in a fuel hose. And, flexibility of the hose can be improved by decreasing a wall-thickness of a resin layer of the hose.

In the above embodiment, the present invention is applied for a hose having one axial end portion that is larger in diameter than the other axial end portion thereof. However, the present invention may be applied also for a hose having one axial end portion that is equal in diameter to the other axial end portion thereof.

According to the embodiment as stated above, when the outer rubber layer 14 is tightened by the hose clamp in a diametrically contracting direction for connecting the hose 10 to the mating pipe, the tightening force is favorably transmitted to the inner rubber layer 16, thereby the hose 10 can be connected to the mating pipe under a good or sufficient tightening force.

Thereby solved is a problem that sealing property is lowered and fuel permeation resistance is impaired due to lack of tightening force during connection of the hose 10 to the mating pipe.

Further, the hose 10 can be easily fitted on the mating pipe with a small force.

And, since the permanent elongation of the inner rubber layer 16 is set equal to or less than 90%, it is prevented over a long period of time that the tightening force is decreased due to fatigue of the inner rubber layer 16, namely irreversible elongation of the inner rubber layer 16 in an axial direction and thereby the sealing pressure is lowered and the fuel permeation resistance is impaired. So, according to the present invention, good sealing property and fuel permeation resistance can be maintained over a long period of time.

Examples of a three-layer hose 10 as shown in FIG. 1 and comparison examples of the three-layer hose 10 of FIG. 3 are prepared. The examples and the comparison examples are prepared by varying combination with respect to a rubber hardness degree of an outer rubber layer, a rubber hardness degree of an inner rubber layer and a permanent elongation of the inner rubber layer, each of the examples and the comparison examples is measured and evaluated with respect to properties such as a sealing property, an easiness of fitting a hose on a mating pipe, and a fuel permeation resistance. The results are shown in Table 2. And, examples of a four-layer hose 10 as shown in FIG. 3 and comparison examples of the four-layer hose 10 are prepared. The examples and the comparison examples are prepared by varying combination with respect to a rubber hardness degree of an outer rubber layer, a rubber hardness degree of an inner rubber layer and a permanent elongation of a first layer of the inner rubber layer, and different permanent elongations of the first layers of the inner rubber layers, each of the examples and the comparison examples is measured and evaluated with respect to properties such as a sealing property, an easiness of fitting a hose on a mating pipe, and a fuel permeation resistance. The results are shown in Table 3.

With regard to the sealing property, each of the examples and the comparison examples is measured and evaluated at an initial stage and after a thermal loading is applied. The thermal loading is applied in a following procedure. A fuel (Fuel C+ethanol (E) 10 volume %) is enclosed in each example/comparison example, and it is maintained at 60° C. for 72 hours. Then the fuel is withdrawn or discarded from it, and it is maintained at 100° C. for 500 hours.

Here, tests with respect to the sealing property, the easiness of fitting the hose, and the fuel permeation resistance are carried out as follows.

Sealing Property

An opening of each of the examples and the comparison examples (the fuel hoses) is plugged with a metal plug made of SUS and having a bulge portion (an outer diameter of the bulge portion: 27.0 mm, an outer diameter of the plug: 25.4 mm). Then, a plugged portion of the fuel hose is tightened by a screw-type hose clamp with a torque at 2 Newton-meters (Nm), the fuel hose is allowed to stand for more than one hour in an atmosphere of 80° C., then, nitrogen (gas) is charged in the fuel hose at a pressure increase rate of 0.1 MPa/minute, and leakage of the nitrogen (gas) through the metal plug is checked. And, the fuel hose is further allowed to stand for more than one hour in an atmosphere of −40° C., then, nitrogen (gas) is charged in the fuel hose at a pressure increase rate of 0.1 MPa/minute, and leakage of the nitrogen (gas) through the metal plug is checked.

Easiness of Fitting the Hose

A fuel hose of each of the examples and the comparison examples is cut to 50 mm in length. An opening of the fuel hose is plugged with a metal plug made of SUS and having a bulge portion (an outer diameter of the bulge portion: 27.0 mm, an outer diameter of the plug: 25.4 mm). A load measuring equipment (load cell) is attached to the metal plug, a pipe is inserted in the fuel hose at a constant speed of 50 mm/minute in a room temperature, and the easiness of fitting the hose on the pipe is evaluated in terms of load for insertion of the pipe.

Fuel (Gasoline) Permeation Resistance

A fuel (Fuel C+E 10 volume %) is enclosed in a fuel hose of each of the examples or the comparison examples and an opening of each of the fuel hoses is plugged with a metal plug made of SUS and having a bulge portion (an outer diameter of the bulge portion: 27.0 mm, an outer diameter of the plug: 25.4 mm). Then, the fuel hose is tightened by a screw-type hose clamp with a torque at 2 Nm, is allowed to stand in an atmosphere of 40° C., and every 168 hours its weight is measured and an enclosed liquid (the fuel, namely Fuel C+E 10 volume %) is replaced until 2000 hours have passed.

Weight decrease every 168 hours is calculated in the following formula.

(Initial weight of the fuel hose)−(weight of the fuel hose after 168 hours)=$W$ (weight decrease)

The given value (weight decrease) is used for calculating an amount of the fuel that permeates through the fuel hose a day per hose.

The fuel (Fuel C+E 10 volume %) used in the test is composed of 45% by weight of isooctane +45% by weight of toluene +10% by weight of ethanol.

TABLE 2

| | | | | Comparison Example 1 | Comparison Example 2 | Comparison Example 3 |
|---|---|---|---|---|---|---|
| Hose structure (three-layers, rubber layer/resin layer/rubber layer) | | Configuration | | NBR(AN = 43)/THV815/ NBR + PVC(AN = 37.5) | | |
| Test item | | Condition | Target value | Measured value | | |
| Material Properties | Permanent elongation (%) | 100° C. × 72 H under constant elongation by 50% | | | 96 | |
| | Inner rubber layer *1)RHD (HA) | (Wall thickness 2.0 mm) | | 65 | 70 | 75 |
| | Outer rubber layer RHD (HA) | (Wall thickness 2.0 mm) | | 75 | 70 | 65 |
| Fuel permeation resistance (mg/day/hose) | Initial stage Fuel C + E10 enclosed, 40° C. × 2000 H | | ≦8 | 2.1 10.6 | 3.4 12.4 | 4.8 16.3 |
| Easiness of fitting of hose (N) | Initial stage Speed 50 mm/min Metal pipe | | ≦200 | 160 | 190 | 220 |
| Sealing property (KPa) | Initial Stage | 80° C. | No leakage at 50 kPa | No leakage at 200 kPa | No leakage at 200 kPa | No leakage at 200 kPa |
| | | −40° C. | | No leakage at 200 kPa | No leakage at 200 kPa | No leakage at 200 kPa |
| | After thermal loading Fuel C + E10 enclosed, 60° C. × 72H → 100° C. × 500 H | 80° C. | | Leakage at 100 kPa | Leakage at 80 kPa | Leakage at 30 kPa |
| | | −40° C. | | Leakage at 150 kPa | Leakage at 150 kPa | Leakage at 50 kPa |

| | | | | Example 1 | Example 2 | Example 3 |
|---|---|---|---|---|---|---|
| Hose structure (three-layers, rubber layer/resin layer/rubber layer) | | Configuration | | NBR(AN = 43)/THV815// NBR + PVC(AN = 37.5) | | |
| Test item | | Condition | Target value | Measured value | | |
| Material Properties | Permanent elongation (%) | 100° C. × 72 H under constant elongation by 50% | | | 90 | |
| | Inner rubber layer *1)RHD (HA) | (Wall thickness 2.0 mm) | | 65 | 65 | 70 |
| | Outer rubber layer RHD (HA) | (Wall thickness 2.0 mm) | | 85 | 75 | 70 |
| Fuel permeation resistance (mg/day/hose) | Initial stage Fuel C + E10 enclosed, 40° C. × 2000 H | | ≦8 | 0.1 4.3 | 0.1 4.3 | 0.6 4.1 |

TABLE 2-continued

| | | | | | | |
|---|---|---|---|---|---|---|
| Easiness of fitting of hose (N) | Initial stage Speed 50 mm/min Metal pipe | | ≦200 | 175 | 160 | 190 |
| Sealing property (KPa) | Initial Stage | 80° C. | No leakage at 50 kPa | No leakage at 200 kPa | No leakage at 200 kPa | No leakage at 200 kPa |
| | | −40° C. | | No leakage at 200 kPa | No leakage at 200 kPa | No leakage at 200 kPa |
| | After thermal loading | 80° C. | | Leakage at 140 kPa | Leakage at 130 kPa | Leakage at 100 kPa |
| | Fuel C + E10 enclosed, 60° C. × 72H → 100° C. × 500 H | −40° C. | | Leakage at 150 kPa | Leakage at 150 kPa | Leakage at 50 kPa |

| | | | Comparison Example 4 | Comparison Example 5 |
|---|---|---|---|---|
| Hose structure (three-layers, rubber layer/resin layer/rubber layer) | | Configuration | NBR(AN = 43)/THV815/ NBR + PVC(AN = 37.5) | |
| Test item | | Condition | Target value | Measured value |
| Material Properties | Permanent elongation (%) | 100° C. × 72 H under constant elongation by 50% | | 90 |
| | Inner rubber layer *1)RHD (HA) | (Wall thickness 2.0 mm) | | 75 | 84 |
| | Outer rubber layer RHD (HA) | (Wall thickness 2.0 mm) | | 65 | 65 |
| Fuel permeation resistance (mg/day/hose) | Initial stage Fuel C + E10 enclosed, 40° C. × 2000 H | | ≦8 | 0.6 5.5 | 11.3 19.5 |
| Easiness of fitting of hose (N) | Initial stage Speed 50 mm/min Metal pipe | | ≦200 | 220 | 270 |
| Sealing property (KPa) | Initial Stage | 80° C. | No leakage at 50 kPa | No leakage at 200 kPa | Leakage at 30 kPa |
| | | −40° C. | | No leakage at 200 kPa | — |
| | After thermal loading | 80° C. | | Leakage at 50 kPa | Leakage at 10 kPa |
| | Fuel C + E10 enclosed, 60° C. × 72H → 100° C. × 500 H | −40° C. | | Leakage at 100 kPa | — |

Note:
*1)RHD = Rubber Hardness Degree

TABLE 3

| | | | Example 4 | Example 5 | Example 6 |
|---|---|---|---|---|---|
| Hose structure (four-layers, first and second layers (rubber layers)/resin layer/rubber layer) | | Configuration | FKM/NBR(AN = 43)/THV815/ NBR + PVC(AN = 37.5) | | |
| Test item | | Condition | Target value | Measured value | |
| Material Properties | Permanent elongation (%) | 100° C. × 72 H under constant elongation by 50% | | 30 | |
| | Inner rubber layer (first layer) *1)RHD (HA) | (Wall thickness 0.5 mm) | | 65 | 65 | 70 |

TABLE 3-continued

| | | | | | | |
|---|---|---|---|---|---|---|
| | Inner rubber layer (second layer) RHD (HA) | (Wall thickness 1.5 mm) | | 70 | 70 | 70 |
| | Outer rubber layer RHD (HA) | (Wall thickness 2.0 mm) | | 85 | 75 | 70 |
| Fuel permeation resistance (mg/day/hose) | Initial stage Fuel C + E10 enclosed, 40° C. × 2000 H | | ≦8 | 0.4 1.5 | 0.4 1.4 | 0.4 1.6 |
| Easiness of fitting of hose (N) | Initial stage Speed 50 mm/min Metal pipe | | ≦200 | 190 | 170 | 190 |
| Sealing property (KPa) | Initial Stage | 80° C. | No leakage at 50 kPa | No leakage at 200 kPa | No leakage at 200 kPa | No leakage at 200 kPa |
| | | −40° C. | | No leakage at 200 kPa | No leakage at 200 kPa | No leakage at 200 kPa |
| | After thermal loading | 80° C. | | Leakage at 150 kPa | Leakage at 180 kPa | Leakage at 160 kPa |
| | Fuel C + E10 enclosed, 60° C. × 72H → 100° C. × 500 H | −40° C. | | No leakage at 200 kPa | Leakage at 180 kPa | No leakage at 200 kPa |

| | | | | Comparison Example 6 | Comparison Example 7 | Example 7 |
|---|---|---|---|---|---|---|
| Hose structure (four-layers, first and second layers (rubber layers)/resin layer/rubber layer) | | Configuration | | FKM/NBR(AN = 43)/THV815/ NBR + PVC(AN = 37.5) | | |
| Test item | | Condition | Target value | Measured value | | |
| Material Properties | Permanent elongation (%) | 100° C. × 72 H under constant elongation by 50% | | 30 | | 6 |
| | Inner rubber layer (first layer) *1)RHD (HA) | (Wall thickness 0.5 mm) | | 75 | 85 | 70 |
| | Inner rubber layer (second layer) RHD (HA) | (Wall thickness 1.5 mm) | | 70 | 70 | 70 |
| | Outer rubber layer RHD (HA) | (Wall thickness 2.0 mm) | | 70 | 70 | 70 |
| Fuel permeation resistance (mg/day/hose) | Initial stage Fuel C + E10 enclosed, 40° C. × 2000 H | | ≦8 | 0.4 2.3 | 13.6 20.2 | 0.6 2.1 |
| Easiness of fitting of hose (N) | Initial stage Speed 50 mm/min Metal pipe | | ≦200 | 250 | 290 | 190 |
| Sealing property (KPa) | Initial Stage | 80° C. | No leakage at 50 kPa | No leakage at 200 kPa | Leakage at 30 kPa | No leakage at 200 kPa |
| | | −40° C. | | No leakage at 200 kPa | — | No leakage at 200 kPa |
| | After thermal loading | 80° C. | | Leakage at 80 kPa | Leakage at 30 kPa | Leakage at 180 kPa |
| | Fuel C + E10 enclosed, 60° C. × 72H → 100° C. × 500 H | −40° C. | | Leakage at 100 kPa | — | No leakage at 200 kPa |

Note:
*1)RHD = Rubber Hardness Degree

Table 2 shows test results of the three-layer fuel hoses. Comparison Examples 1, 2 and 3 that do not satisfy the conditions of the present invention. Each of Comparison Examples 1, 2 and 3 includes an inner rubber layer having a permanent elongation of 96% that is greater than the maximum value of the present invention, 90% and further Comparison Example 3 includes an inner rubber layer having a rubber hardness degree greater than that of an outer rubber layer. In Comparison Examples 1, 2 and 3, a fuel permeation resistance is insufficient. In Comparison Example 3, an easiness of fitting of a hose and the sealing property are insufficient as well as a fuel permeation resistance.

Each of Comparison Examples 4 and 5 includes an inner rubber layer having a permanent elongation of 90% and a rubber hardness degree greater than that of an outer rubber layer. Each of them satisfies the condition of the inner rubber layer of the present invention with respect to the permanent elongation of the inner rubber layer, but not with respect to rubber hardness degree. In Comparison Examples 4 and 5, properties are not satisfactory.

On the contrary, each of Example 1, Example 2 and Example 3 includes an inner rubber layer having a permanent elongation of 90% and a rubber hardness equal to or smaller than that of an outer rubber layer. Each of them satisfies the condition of the present invention. In Example 1, Example 2 and Example 3, all of properties are satisfactory.

Table 3 shows test results of the four-layer fuel hoses. Each of Comparison Examples 6 and 7 includes an inner rubber layer having a permanent elongation of 30% and a rubber hardness degree greater than that of an outer rubber layer. Each of them satisfies the condition of the inner rubber layer of the present invention with respect to the permanent elongation of the inner rubber layer, but not with respect to the rubber hardness degree. In Comparison Examples 6 and 7, some of properties or all of properties are not satisfactory.

On the contrary, each of Example 4, Example 5, Example 6 and Example 7 satisfies the condition of the present invention with respect to the permanent elongation of the inner rubber layer, and a relation between the rubber hardness degrees of the inner rubber layer and an outer rubber layer. In Example 4, Example 5, Example 6 and Example 7, all of properties are satisfactory.

Since each of the hoses 10 shown in FIGS. 1, 3 and 4, progressively and continuously increases in inner and outer diameters toward one axial end on each of the curved portions 10-1, 10-2 and 10-3, an excessive length, slack or loosening created on an inner side of the curved portions is absorbed by an elongation in a circumferential direction, or offset with the elongation in the circumferential direction based on continuous increase in diameter of the curved portions, namely forced diametrical expansion of the resin layer 12. As a result, the above wave-shaped deformation behavior can be favorably prevented from being created on the inner side of each of the curved portions 10-1, 10-2 and 10-3. That is, the hose 10 can be favorably formed entirely in a curved shape as intended without exhibiting a wave-shaped deformation behavior.

And, in the procedure of producing the hose 10, a straight tubular hose body can be favorably fitted and deformed on a mandrel with no difficulty. And, the tubular hose body after vulcanized, namely the hose 10 can be easily removed relatively from the mandrel by a small pull force. And, the hose 10 of curved shape can be easily produced in a small number of steps, and thereby produced at much lower cost than before.

The hose 10 may be considered as a resin composite hose of curved shape that includes at least one curved portion at a certain axial position thereof or at one axial position thereof, and has a multilayer construction, and comprises a resin layer having permeation resistance to a transported fluid and serving as a barrier layer, an inner rubber layer as an inner surface layer on an inner side of the resin layer and an outer rubber layer on an outer side of the resin layer. The resin composite hose is formed generally or overall in a shape as follows. The resin composite hose has one axial end that is larger in diameter than the other axial end of the resin composite hose. The curved portion is formed in a shape of continuously, for example, and progressively increasing diameter from a curve beginning end of the curved portion with a small diameter near the other axial end of the resin composite hose to a curve terminal end of the curved portion with a large diameter near the one axial end thereof. Or, the hose 10 may be considered as a resin composite hose of curved shape that includes a plurality of the curved portions at certain axial positions or at a plurality of the axial positions thereof. Each of the curved portions may be formed in a shape of continuously, for example, and progressively increasing diameter from the curve beginning end to the curve terminal end. The plurality of the curved portions may be arranged in order of increasing diameter from the other axial end of the resin composite hose toward the one axial end thereof. And, such resin composite hose of curved shape can be produced in a method comprises a step of forming a straight tubular hose body by successively laminating the inner rubber layer, the resin layer and the outer rubber layer on one another by extrusion, a step of preparing a mandrel having a shape corresponding to a shape of inner surface of the resin composite hose of curved shape, a step of relatively fitting the straight tubular hose body on the mandrel and deforming the straight tubular hose body to obtain a curved tubular hose body, and a step of vulcanizing the curved tubular hose body to obtain the resin composite hose of curved shape. The straight tubular hose body is multi-layered, plastically deformable, and further unvulcanized or semivulcanized.

Although the preferred embodiments have been described above, these are only some of embodiments of the present invention.

For example, although the fuel hose of the above embodiment does not include a corrugated portion, as the case may be, the present invention may be adapted for a fuel hose including the corrugated portion. Or, for example, the present invention may be adapted for a fuel hose having more than one outer rubber layers. As such, the present invention can be embodied by a variety of modifications without departing from the scope of the invention.

What is claimed is:

1. A resin composite fuel hose of a multilayer construction, comprising:
    a resin layer having permeation resistance to a fuel and serving as a barrier layer, an inner rubber layer as an inner surface layer laminated on an inner side of the resin layer and an outer rubber layer laminated on an outer side of the resin layer,
    wherein the outer rubber layer has a rubber hardness degree equal to or greater than that of the inner rubber layer, and the inner rubber layer has a permanent elongation equal to or less than 90% according to JISK6262;
    wherein the fuel hose further comprises a curved portion at a certain axial position thereof, one axial end of the fuel hose being larger in diameter than the other axial end thereof;
    wherein the curved portion is formed in a shape of continuously increasing diameter from a curve beginning end of the curved portion with a small diameter near the other axial end of the fuel hose to a curve terminal end of the curved portion with a large diameter near the one axial end thereof.

2. The resin composite fuel hose as set forth in claim 1, wherein the inner rubber layer has a rubber hardness degree in a range of 65 to 80 according to a durometer hardness test (type A) of JISK6253.

3. The resin composite fuel hose as set forth in claim 1, wherein the outer rubber layer has a rubber hardness degree in a range of 65 to 85 according to a durometer hardness test (type A) of JISK6253.

4. The resin composite fuel hose as set forth in claim 1, wherein the curved portions are formed at a plurality of the axial positions.

* * * * *